(12) United States Patent
Langley

(10) Patent No.: US 6,970,582 B2
(45) Date of Patent: Nov. 29, 2005

(54) METHOD AND SYSTEM FOR IDENTITY VERIFICATION USING MULTIPLE SIMULTANEOUSLY SCANNED BIOMETRIC IMAGES

(75) Inventor: Richard J. Langley, Vienna, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 677 days.

(21) Appl. No.: 09/800,843

(22) Filed: Mar. 6, 2001

(65) Prior Publication Data

US 2002/0126881 A1    Sep. 12, 2002

(51) Int. Cl.[7] .............................................. G06K 9/00
(52) U.S. Cl. ...................... 382/124; 382/218; 382/305; 382/312; 340/5.53
(58) Field of Search ........................ 382/115, 124, 125, 382/127, 197, 224, 321, 210, 218, 304, 305, 382/312; 340/5.53, 5.83, 5.82

(56) References Cited

U.S. PATENT DOCUMENTS

| 3,968,476 | A | * | 7/1976 | McMahon | 382/127 |
|---|---|---|---|---|---|
| 4,151,512 | A | * | 4/1979 | Riganati et al. | 382/125 |
| 5,073,949 | A | * | 12/1991 | Takeda et al. | 382/115 |
| 5,177,802 | A | * | 1/1993 | Fujimoto et al. | 382/124 |
| 5,180,901 | A | * | 1/1993 | Hiramatsu | 235/380 |
| 5,559,504 | A | * | 9/1996 | Itsumi et al. | 340/5.53 |
| 5,841,888 | A | * | 11/1998 | Setlak et al. | 382/124 |
| 5,869,822 | A | * | 2/1999 | Meadows et al. | 235/380 |
| 5,953,441 | A | * | 9/1999 | Setlak | 340/5.83 |
| 5,956,415 | A | * | 9/1999 | McCalley et al. | 382/124 |
| 6,181,807 | B1 | * | 1/2001 | Setlak et al. | 382/124 |
| 6,198,836 | B1 | * | 3/2001 | Hauke | 382/125 |
| 6,484,260 | B1 | * | 11/2002 | Scott et al. | 713/186 |
| 6,628,377 | B1 | * | 9/2003 | Sabatini et al. | 356/71 |

* cited by examiner

*Primary Examiner*—Bhavesh M. Mehta
*Assistant Examiner*—Sheela Chawan
(74) *Attorney, Agent, or Firm*—Tarolli, Sundheim, Covell & Tummino L.L.P.

(57) ABSTRACT

Accuracy and speed of biometric identity verification are significantly improved by use of multiple simultaneous scans of biometric features of a user, such as multiple fingerprints, using multiple scanners (40, 50) of smaller size than would be needed to accommodate all of the fingerprints in a single scanner (30), and using multiple parallel processors (42, 52), or a single higher speed processor, to process the fingerprint data more efficiently. Obtaining biometric data from multiple user features by use of multiple scanners increases verification accuracy, but without the higher cost and slower processing speed that would be incurred if a single large scanner were to be used for improved accuracy.

10 Claims, 2 Drawing Sheets

METHOD AND SYSTEM FOR IDENTITY VERIFICATION USING MULTIPLE SIMULTANEOUSLY SCANNED BIOMETRIC IMAGES

BACKGROUND OF THE INVENTION

This invention relates generally to identity verification techniques using biometric data and, more specifically, to the use of biometric data, such as fingerprints, to provide identity verification in real time. Although techniques for biometric verification of personal identity have been widely disclosed, widespread application of biometric identity verification systems to consumers has not occurred, largely because of the relatively high cost and lack of practical usability of such systems for high-speed or real-time identity verification. To be usable in a practical application, a biometric verification system must meet requirements of accuracy, size and convenience. "Accuracy" pertains principally to the percentage of access requests that are granted to legitimate users on a first attempt. "Size" refers to the size of scanning and verification equipment, and particularly the size of the fingerprint scanner. As will be further discussed, the scanner size has an impact on cost, speed of operation, and convenience for the user. "Convenience" includes ease of use as well as speed of operation. A fingerprint scanner may be easy to use, but a long processing delay will reduce its overall convenience. Low accuracy also negatively impacts convenience of use.

Devices using fingerprint scanning of a single finger, with either rolled or flat scanning, have a single trial accuracy limit of 95–99% using any currently known fingerprint matching algorithm. Thus, between one and five of every one hundred attempts at identity verification by legitimate users will result in failure to gain access to whatever is being protected by the biometric device. Upon rejection, the user must make another attempt, possibly using an alternate finger if the system has been set up to accommodate this type of action. In many important applications of biometric verification, this level of accuracy is not acceptable from a convenience standpoint.

Although accuracy can be improved by increasing the size of the fingerprint scanner to accommodate a larger area of the finger, or possibly two fingers, there is an important tradeoff that designers of such systems face. Larger scanning devices cost significantly more and require a significantly longer processing time. In fact the cost of a fingerprint scanner increases at greater than a linear rate. That is to say, the cost of one large sensor will be significantly greater than the combined cost of two sensors of half the size of the large sensor. The processing time for virtually all verification algorithms is roughly proportional to the square of the sensor size. Accordingly, improvements in accuracy obtained by using a larger fingerprint sensor are accompanied by both a higher sensor cost and a longer processing time. In other words, accuracy is improved only at the expense of economy and convenience.

All commercially available fingerprint identity verification systems available at the time of the present invention utilize single finger collection and verification, with two possible exceptions. Both arise in law enforcement applications, where real-time identity verification is rarely a concern. Some police agencies use a single fingerprint capture device to capture images of all ten fingers in succession. The images are not captured simultaneously and the purpose is not to support real-time verification of identity. Police may also use a large fingerprint scanner to simultaneously record the fingerprints of all four fingers on each hand, referred to as a "slap." The purpose of a slap, on a conventional (ink-on-paper) fingerprint card, is to verify that each fingerprint image has been placed in the correct box on the card. When a "slap" is obtained with a scanner, the purpose is the same, i.e., to verify that the correct fingers have been used to obtain of each of four separately scanned fingerprints. A very large and expensive scanning device is used to obtain the "slap."

It will be apparent from the foregoing that there is a need for alternative technique or improving the accuracy and convenience of fingerprint identity verification systems. The present invention is directed to this end.

SUMMARY OF THE INVENTION

The present invention resides in a method and corresponding system, for obtaining increased accuracy in identity verification by using multiple simultaneously scanned biometric features. Briefly, and in general terms, the method of the invention comprises the steps of: scanning at least two biometric features of a user simultaneously, using at least two practically identical biometric scanners; processing data from the at least two scanners in at least one processor, to obtain biometric data that uniquely identify the scanned biometric features; and comparing the biometric data with reference biometric data recorded from the user during an enrollment procedure, to verify the identity of the user. Simultaneous use of multiple biometric scanners and multiple parallel processors, or a single higher speed processor, provides desirable improvements in accuracy and processing speed, at a significantly lower cost than by using a single, larger biometric scanner.

In the disclosed embodiment of the invention, the step of scanning includes scanning at least two fingerprints of the user simultaneously. The scanning step can be either scanning the fingerprints with at least two two-dimensional scanners, or scanning the fingerprints with at least two one-dimensional scanners. If one-dimensional scanners are used, the step of processing the data from the scanners includes converting one-dimensional scanner data to two-dimensional fingerprint data.

In terms of a novel system, the invention comprises: at least two practically identical biometric scanners, for scanning at least two biometric features of a user simultaneously; at least one processor, for processing data from the at least two scanners to obtain biometric data that uniquely identify the scanned biometric features; and comparison logic, for comparing the biometric data with reference biometric data recorded from the user during an enrollment procedure, to verify the identity of the user. Simultaneous use of multiple biometric scanners provides desirable improvements in accuracy and processing speed, at a lower cost than by using a single, larger biometric scanner.

In the system as disclosed by way of example, the scanners are fingerprint scanners, for scanning at least two fingerprints of the user simultaneously, and parallel processors are used. It will be understood, however, that a single processor operating at a higher speed could handle the processing of data from multiple scanners. The fingerprint scanners may be two-dimensional scanners or one-dimensional scanners. If one-dimensional scanners are used, the parallel processors each include conversion logic, for converting one-dimensional scanner data to two-dimensional fingerprint data. In one disclosed embodiment, the one-dimensional scanners are combined to form a single, logically segmented one-dimensional scanner.

It will be appreciated from this summary that the present invention provides significant advantages over identity verification systems available in the past. In particular, the invention improves accuracy because of its simultaneous use of multiple biometric features, but without the sacrifices of higher cost and slower speed usually associated with increasing the scope of a biometric scan. Other aspects and advantages of the invention will become apparent from the following more detailed description, taken in conjunction with the drawings, of which the following is a brief description.

DESCRIPTION OF THE PREFERRED EMBODIMENTS

Figure 1:
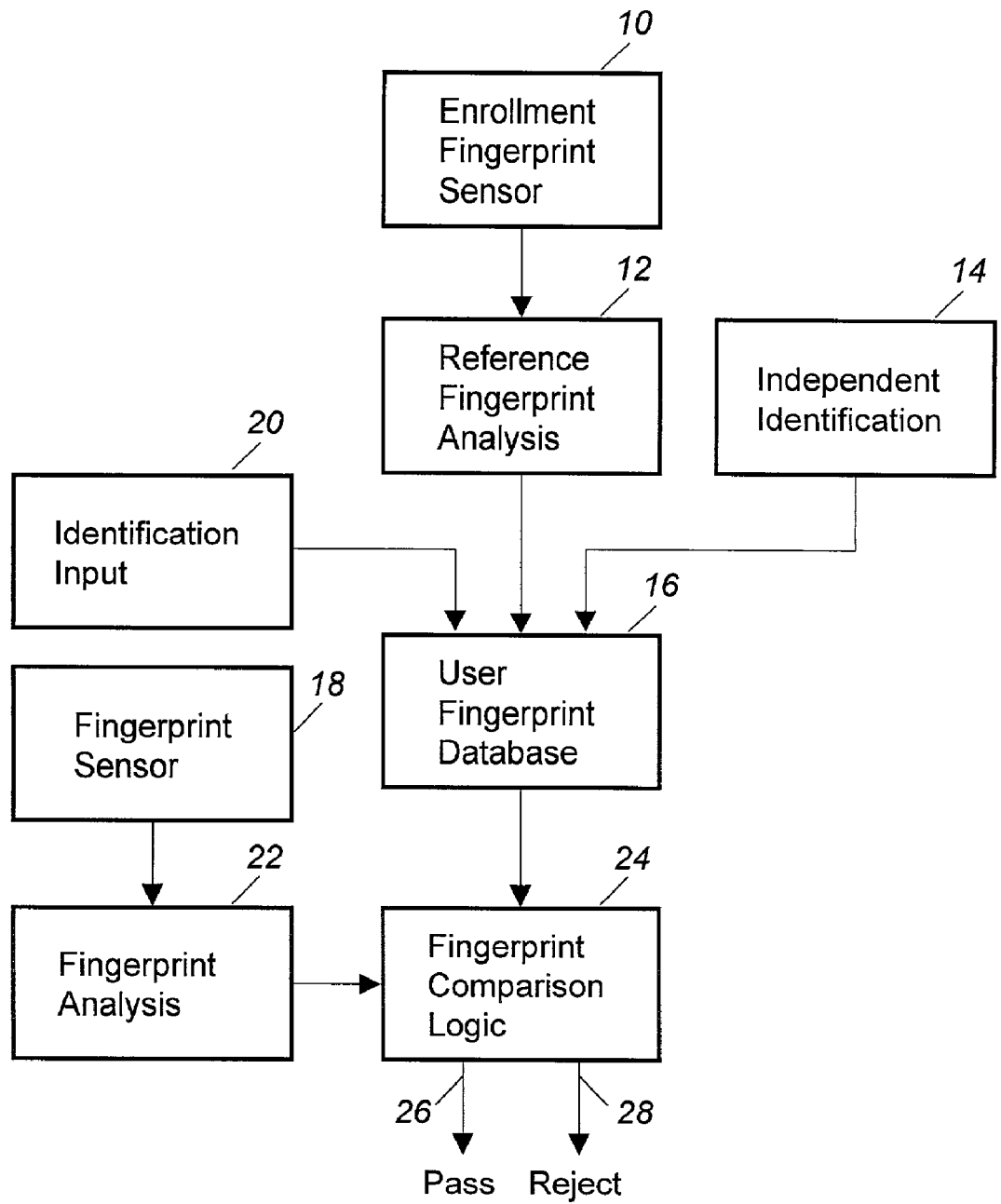
FIG. 1 is a simplified block diagram showing the basic functions of a fingerprint identity verification system.

As shown in the drawings for purposes of illustration, the present invention pertains to identity verification using biometric data, such as fingerprints. In a typical system of this general type, a user is first "enrolled" by use of an enrollment fingerprint sensor, as shown at reference numeral 10. The fingerprint is analyzed, as indicated in block 12, to generate a set of parameters that uniquely define the fingerprint in some manner. The specific steps performed in analysis of the "reference" fingerprint will depend on which fingerprint comparison algorithm is to be used to identify the user. In general, the fingerprint image will be analyzed to identify a number of features that uniquely define the fingerprint. In many algorithms, it is the presence and relative positions of fingerprint features that are used to uniquely identify the fingerprint. For most practical systems, recording an entire fingerprint image would exceed the capacity of any economical database and would result in very slow comparison times. Therefore, most systems record only the salient features of the reference fingerprint image. As part of the enrollment process, the user also provides some independently verifiable form of identification, as indicated by block 14. A unique user identifier, such as an employee number or customer number, is stored with the reference fingerprint data in a user fingerprint database, shown as block 16.

In using this system for identity verification, a user places a finger over a fingerprint sensor 18, from which is derived a digitized image of the user's fingerprint. The user also supplies a user identification, such as an employee number or customer number, using an identification input device 20 of some kind. This could be a keypad or badge or card reader, for example. The fingerprint image is analyzed, as shown in block 22, in the same way that the reference fingerprint image was analyzed, and the resulting parameters are compared with those of a reference fingerprint image retrieved from the database 16, using the user's identification to access the database. If the currently obtained fingerprint image matches the reference image, the user is granted access to a property being protected by the system, as indicated by the "pass" signal on line 26 from the comparison logic 24. If the comparison results in a failure to verify the user's identity, the attempted access is rejected, as indicated by the "reject" signal on line 28. The protected property may be a physical building or vehicle, or it may be a computer system, providing access to a bank account, for example.

Figure 2:
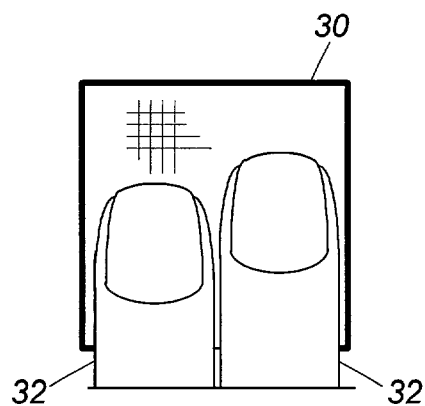
FIG. 2 is diagrammatic view of a single two-dimensional fingerprint sensor of the prior art, wherein accuracy improvement is obtained at the expense of a more costly sensor and slower processing speed.

Unfortunately, identity verification using a single fingerprint will correctly identify a legitimate user only approximately 95–99% of the time. Although this level of accuracy can be improved by increasing the size of the sensor 30 to accommodate the combined width of two fingers 32 that are pressed against the sensor, as shown diagrammatically in FIG. 2, doing so results in a significantly higher equipment cost and a significantly longer processing time for each fingerprint comparison.

Figure 3:
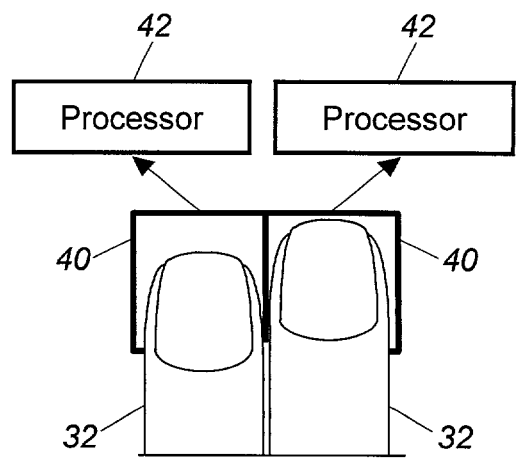
FIG. 3 is a diagrammatic view of a pair of two-dimensional fingerprint sensors used in accordance with the present invention, for higher accuracy without high cost or slow processing speed.

In accordance with the present invention, two or more fingerprints are captured using multiple small, inexpensive sensors 40 (FIG. 3). Each of the fingers 32 is pressed against one of the sensors 40, and each sensor provides its output data to a separate processor 42. The processors 42 operate in parallel. Since information is being collected from more than one finger, a smaller sensor size can be used for each finger, thereby reducing the cost of the sensors and the processing time for each processor 42. Even though the cost and processing time have been lowered, a significant improvement in accuracy can be achieved. For example, if it is assumed that a relatively small sensor size is used, providing a single-finger accuracy of 95%, then collecting two fingerprints simultaneously would support accuracy as high as $(1.0-(0.05\times0.05))=99.75\%$, assuming completely independent results for the two fingers. The degree of independence between the fingerprints of two fingers has been measured empirically, and although not complete, it is very close to complete. In the above example, the degree of independence would support an accuracy of approximately 99.6%.

Figure 4:
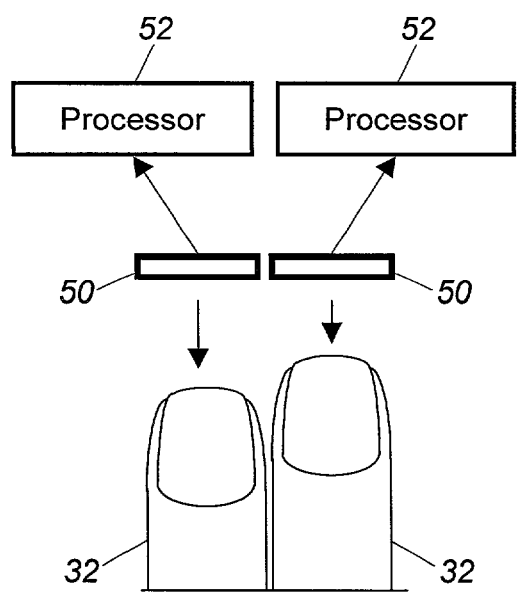
FIG. 4 is a diagrammatic view of a pair of one-dimensional fingerprint sensors used in accordance with the present invention.
Figure 5:
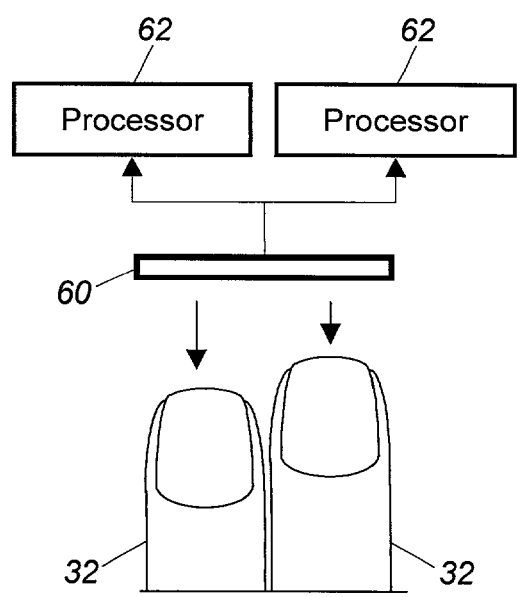
FIG. 5 is a diagrammatic view of a single one-dimensional sensor used in accordance with the present invention.

The data obtained from a two-dimensional fingerprint sensor can also be obtained from a one-dimensional sensor, across which the finger is "swiped." Therefore, another variant of the invention is to apply the same principles to a pair of one-dimensional sensors 50, as shown in FIG. 4. The fingers 32 are swiped across the respective sensors 50, the outputs of which are coupled to separate, parallel processors 52. Moreover, because one-dimensional sensors do not generally increase in cost as the square of the size, the concept of the invention can be applied to a slightly wider sensor 60 that allows the multiple fingers 32 to be swiped at the same time, as shown in FIG. 5. In this case output data from the sensor 60 is logically split along two or more paths for parallel processing in separate processors 62.

It will be understood that the processors 42, 52 or 62 may be used to perform all of the fingerprint analysis and correlation functions discussed with reference to FIG. 1. For each fingerprint compared with previously stored reference fingerprint data, a separate pass/reject or match/no-match signal will be generated. These multiple results may be combined in any desired way, such as by logically ANDing or logically ORing, depending on the level of security desired.

Although multiple processors are depicted at 42, 52 and 62, it will be understood that a single processor of appropriate speed might be employed in each instance. In other words, the parallel processing functions shown as being performed in multiple processors may be performed with equivalent results in a single, higher speed processor performing parallel processing with appropriate software, such as by multitasking.

Any suitable fingerprint correlation algorithm may be used in conjunction with the present invention. For example the correlation technique disclosed in copending U.S. patent application Ser. No. 08/995,330, filed Dec. 22, 1997, now U.S. Pat. No. 6,134,340 entitled "Fingerprint Feature Correlator," may be employed to perform the necessary steps of fingerprint analysis and correlation.

It will be apparent from the foregoing that the present invention provides a significant improvement over identity verification systems of the prior art. In summary, the invention provides higher accuracy, faster processing, lower sensor costs, more efficient use of device space, and simplicity of use.

Higher accuracy results from using at least twice as much fingerprint information in a single verification operation. Faster verification processing is obtained because multiple fingerprint sensors can be easily coupled to multiple processors operating in parallel. Lower sensor costs follow from the use of small, readily available sensors instead of larger customized sensors. Multiple sensors increase the consumption of space only linearly, rather than in proportion to the square or cube of the sensor dimensions. For example, two sensors occupy only twice as much space or volume as a single sensor, but doubling the size of a sensor is likely to increase the space or volume consumed by a factor of four. Finally, a multiple-finger, multiple-scanner device is just as easy to use as a single-finger, single-scanner device. From a user standpoint, the only difference is how many fingers the user must place in the scanning device.

Although the invention has been described in detail for purposes of illustration, it will be appreciated that various modifications could be made without departing from the spirit and scope of the invention. For example, although the invention has been described in terms applicable to identity verification by fingerprint correlation, it will be understood that the principles of the invention apply equally well to identity verification using other biometric properties, such iris scans of two eyes using two scanners. Accordingly, the invention should not be limited except as by the accompanying claims.

What is claimed is:

1. A method for performing biometric identity verification with improved accuracy, the method comprising the steps of:
   scanning at least two biometric features of a user simultaneously, using at least two practically identical one-dimensional biometric scanners;
   processing data from the at least two scanners in at least one processor, to obtain biometric data that uniquely identify the scanned biometric features; and
   comparing the biometric data with reference biometric data recorded from the user during an enrollment procedure, to verify the identity of the user;
   wherein simultaneous use of multiple biometric scanners provides desirable improvements in accuracy and processing speed, at a lower cost than by using a single, larger biometric scanner.

2. A method for performing biometric identity verification with improved accuracy, the method comprising the steps of:
   scanning at least two biometric features of a user simultaneously, using at least two practically identical biometric scanners;
   processing data from the at least two scanners, in at least two processors operating in parallel, to obtain biometric data that uniquely identify the scanned biometric features; and
   comparing the biometric data with reference biometric data recorded from the user during an enrollment procedure, to verify the identity of the user;
   wherein simultaneous use of multiple biometric scanners provides desirable improvements in accuracy and processing speed, at a lower cost than by using a single, larger biometric scanner.

3. A method for performing biometric identity verification with improved accuracy, the method comprising the steps of:
   scanning at least two fingerprints of a user simultaneously, using at least two practically identical one-dimensional biometric scanners;
   processing data from the at least two scanners in at least one processor, to obtain biometric data that uniquely identify the scanned biometric features; and
   comparing the biometric data with reference biometric data recorded from the user during an enrollment procedure, to verify the identity of the user;
   wherein simultaneous use of multiple biometric scanners provides desirable improvements in accuracy and processing speed, at a lower cost than by using a single, larger biometric scanner.

4. A method for performing biometric identity verification with improved accuracy, the method comprising the steps of:
   scanning at least two fingerprints of a user simultaneously by a relative swiping of at least two practically identical one-dimensional scanners;
   processing data from the at least two scanners in at least one processor, including converting one-dimensional scanner data to two-dimensional fingerprint data, to obtain biometric data that uniquely identify the scanned biometric features; and
   comparing the biometric data with reference biometric data recorded from the user during an enrollment procedure, to verify the identity of the user;
   wherein simultaneous use of multiple biometric scanners provides desirable improvements in accuracy and processing speed, at a lower cost than by using a single, larger biometric scanner.

5. A method as defined in claim 4, wherein the step of scanning at least two fingerprints uses a single, logically segmented one-dimensional scanner.

6. A system for performing biometric identity verification with improved accuracy, the system comprising:
   at least two practically identical one-dimensional biometric scanners, for scanning at least two biometric features of a user simultaneously;
   at least one processor, for processing data from the at least two scanners to obtain biometric data that uniquely identify the scanned biometric features; and
   comparison logic, for comparing the biometric data with reference biometric data recorded from the user during an enrollment procedure, to verify the identity of the user;
   wherein simultaneous use of multiple biometric scanners provides desirable improvements in accuracy and processing speed, at a lower cost than by using a single, larger biometric scanner.

7. A system as defined in claim 6, wherein the at least one processor includes at least two processors operating in parallel.

8. A system as defined in claim 6, wherein the scanners are fingerprint scanners, for scanning at least two fingerprints of the user simultaneously.

9. A system for performing biometric identity verification with improved accuracy, the system comprising:
- at least two practically identical one-dimensional fingerprint scanners, for scanning at least two fingerprints of a user simultaneously;
- two processors ordinarily in parallel each including conversion logic, for processing data from the at least two scanners to obtain biometric data that uniquely identify the scanned biometric features; including converting one-dimensional scanner data to two-dimensional fingerprint data; and
- comparison logic, for comparing the biometric data with reference biometric data recorded from the user during an enrollment procedure, to verify the identity of the user;
- wherein simultaneous use of multiple biometric scanners provides desirable improvements in accuracy and processing speed, at a lower cost than by using a single, larger biometric scanner.

10. A system for performing biometric identity verification with improved accuracy, the system comprising:
- at least two practically identical one-dimensional fingerprint scanners combined to form a single logically segmented one-dimensional scanner, for scanning at least two fingerprints of a user simultaneously;
- two processors ordinarily in parallel each including conversion logic for processing data from the at least two scanners to obtain biometric data that uniquely identify the scanned biometric features, including converting one-dimensional scanner data to two-dimensional fingerprint data; and
- comparison logic, for comparing the biometric data with reference biometric data recorded from the user during an enrollment procedure, to verify the identity of the user;
- wherein simultaneous use of multiple biometric scanners provides desirable improvements in accuracy and processing speed, at a lower cost than by using a single, larger biometric scanner.

* * * * *